US010562723B2

(12) United States Patent
Lawlor et al.

(10) Patent No.: US 10,562,723 B2
(45) Date of Patent: Feb. 18, 2020

(54) ITEM INVENTORY MANAGEMENT SYSTEM WITH VACUUM OPERATED ROBOTIC CARD SORTER

(71) Applicant: Sorting Robotics Inc., Van Nuys, CA (US)

(72) Inventors: Sean Lawlor, Van Nuys, CA (US); Nohtal Partansky, Van Nuys, CA (US); Cassio Elias Dos Santos, Jr., Van Nuys, CA (US)

(73) Assignee: Sorting Robotics Inc., Van Nuys, CA (US)

( * ) Notice: Subject to any disclaimer, the term of this patent is extended or adjusted under 35 U.S.C. 154(b) by 0 days.

(21) Appl. No.: 16/452,490

(22) Filed: Jun. 25, 2019

(65) Prior Publication Data

US 2019/0315577 A1    Oct. 17, 2019

Related U.S. Application Data

(63) Continuation of application No. 16/365,408, filed on Mar. 26, 2019.

(60) Provisional application No. 62/664,249, filed on Apr. 29, 2018, provisional application No. 62/654,340, filed on Apr. 7, 2018.

(51) Int. Cl.
*B65H 3/08* (2006.01)
*B25J 15/06* (2006.01)
*B65G 47/91* (2006.01)
*B07C 5/00* (2006.01)
*B65D 25/00* (2006.01)
(Continued)

(52) U.S. Cl.
CPC ............. *B65H 3/0816* (2013.01); *B07C 5/00* (2013.01); *B25J 15/0616* (2013.01); *B65D 25/00* (2013.01); *B65D 25/04* (2013.01); *B65D 25/10* (2013.01); *B65G 47/91* (2013.01); *B65G 2201/02* (2013.01)

(58) Field of Classification Search
CPC .................................................. B65H 3/0816
See application file for complete search history.

(56) References Cited

U.S. PATENT DOCUMENTS 5,033,730 A * 7/1991 Davies .................... B65G 59/04
271/106
5,088,878 A * 2/1992 Focke .................... B65G 47/91
294/188

(Continued)

*Primary Examiner* — Thomas Randazzo
(74) *Attorney, Agent, or Firm* — Cognition IP, P.C.; Bryant Lee

(57) ABSTRACT

A system for robotic sorting includes a bin system comprising a plurality of bins for holding items to be sorted, where each bin is configured to hold more than one of the items. The system further includes an item handling system configured to travel to each of the plurality of bins. The item handling system utilizes a vacuum force to remove an item held in one of the plurality of bins. The item handling system further utilizes one or more curvature generation devices to enable card manipulation. Additionally, the system includes a drive system coupled to the item handling system. The drive system is configured to move and position the item handling system over each of the plurality of bins. The system also includes a control system coupled to the drive system and the item handling system. The control system controls movement of the item handling system and the drive system.

19 Claims, 10 Drawing Sheets

(51) Int. Cl.
  *B65D 25/04* (2006.01)
  *B65D 25/10* (2006.01)

(56) References Cited

U.S. PATENT DOCUMENTS

| | | | | |
|---|---|---|---|---|
| 5,234,207 A * | 8/1993 | Lindstrom | ............... | B65H 3/48 271/106 |
| 5,989,386 A * | 11/1999 | Elliott | ................. | B65H 3/0816 156/285 |
| 6,061,607 A * | 5/2000 | Bradley | ............... | B65G 1/1376 414/273 |
| 2002/0092801 A1* | 7/2002 | Dominguez | ......... | B07C 5/3412 209/583 |
| 2003/0000871 A1* | 1/2003 | Fitzgibbons | ............. | B07C 3/00 209/534 |
| 2007/0257040 A1* | 11/2007 | Price, Jr. | ................ | B65D 25/02 220/507 |
| 2008/0061492 A1* | 3/2008 | Zwettler | ............. | B65H 3/0816 271/20 |
| 2011/0071666 A1* | 3/2011 | Martin | ..................... | B65H 1/28 700/231 |
| 2011/0166696 A1* | 7/2011 | Nignon | ..................... | B07C 5/28 700/223 |
| 2013/0085604 A1* | 4/2013 | Irie | ........................ | B25J 9/1687 700/258 |
| 2014/0346727 A1* | 11/2014 | Shiraishi | ................. | B65H 3/48 271/11 |
| 2015/0081090 A1* | 3/2015 | Dong | .................... | B07C 5/3422 700/230 |
| 2015/0115024 A1* | 4/2015 | Finol | ..................... | B65D 85/34 229/117.16 |
| 2015/0352717 A1* | 12/2015 | Mundt | .................. | B25J 9/1664 414/730 |
| 2016/0176672 A1* | 6/2016 | Lochbichler | ........... | B65H 39/10 270/58.04 |
| 2016/0214812 A1* | 7/2016 | Johnson | ............... | B65H 3/0816 |
| 2017/0121114 A1* | 5/2017 | Einav | ................ | B65D 21/0235 |
| 2018/0194577 A1* | 7/2018 | Gross | ....................... | B65H 3/08 |
| 2018/0256967 A1* | 9/2018 | Downs, III | ............ | A63F 1/12 |
| 2019/0308824 A1* | 10/2019 | Lawlor | .................. | B65D 25/00 |

* cited by examiner

ITEM INVENTORY MANAGEMENT SYSTEM WITH VACUUM OPERATED ROBOTIC CARD SORTER

CROSS-REFERENCE TO RELATED APPLICATIONS

This application is a continuation of U.S. application Ser. No. 16/365,408, filed Mar. 26, 2019, which claims priority to U.S. provisional patent application No. 62/654,340, filed Apr. 7, 2018, and U.S. provisional patent application No. 62/664,249, filed Apr. 29, 2018, which are each hereby incorporated by reference in their entirety.

FIELD

The present disclosure relates generally to robotic sorting.

BACKGROUND

Playing cards for card games are often stored in stacks. Both during the normal use of the cards and otherwise, a stack of cards may become disorganized. This is especially common for large quantities of cards, but may also occur for any quantity of cards in a stack.

When a stack becomes disorganized, the contents of a stack may be unknown or not accurately known. An individual interested in the contents of the stack often will work to identify all cards within the stack and reorganize the cards by some preferred order. This sort order is any method chosen by the individual to order the cards after the cards have been identified.

Identification and organization of a stack has been done largely by-hand to date, by manually identifying and then organizing cards. Collectively, identifying the cards in a stack and organizing the stack by the sort order is "sorting." Sorting by humans is typically non-destructive, as human sorting involves essentially the same interaction with the cards during sorting as during play. Further, human sorting is subject to the recognition ability, memory and dexterity of the human to place the identified card in the correct location in the sorted stack, and other factors related to human involvement in sorting. Thus, human sorting presents multiple problems for sorting.

Sorting by robotic means, however, is more challenging to implement because of the greater potential for damage to the cards during sorting. If damaged, the cards may lose value or usability for play or sale if damaged. Damage comes in a variety of forms, but the distinguishing characteristic is typically wear on the cards which is greater than what would be created through play.

There are numerous automated solutions in similar industries which rapidly identify and sort. One such example is currency counters which use wheels to pull paper currency through a slot where the currency is identified sequentially. This solution has enormous potential to damage the cards because the solution was designed for paper currency which is routinely taken out of circulation and replaced. Though human sorting usually ensures the cards are not damaged, this is not guaranteed.

There exists a need for a system to automate sorting which minimizes human involvement, decreases the time to sort, and overall improves the accuracy of sorting.

SUMMARY

In some implementations, a system for robotic sorting includes a bin system comprising a plurality of bins for holding items to be sorted, where each bin is configured to hold more than one of the items. The system further includes an item handling system configured to travel to each of the plurality of bins. The item handling system utilizes a vacuum force to remove an item held in one of the plurality of bins. The item handling system includes an end effector that utilizes a vacuum force to remove an item held in one of the plurality of bins, and one or more curvature generation devices that impart a curvature on the item held in the one or the plurality of bins and enable movement of a single item. Additionally, the system includes a drive system coupled to the item handling system. The drive system is configured to move and position the item handling system over each of the plurality of bins. The system also includes a control system coupled to the drive system and the item handling system. The control system controls movement of the item handling system and the drive system.

Additionally, in some implementations a device for moving items in a robotic sorting, includes a vacuum end effector configured to extend into a bin in a bin system, apply the vacuum force to an item from a group of items held in bin, and extract the item from the bin. The device also includes an end effector tip coupled to a distal end of the vacuum end effector and configured to contact the item. The device also includes one or more curvature generation devices that impart a curvature on the item from the bin and enable movement of a single item.

Additionally, in some implementations, a system for managing an inventory includes a first robotic sorting system. The first robotic sorting system includes a first item handling system configured to travel between a first plurality of bins and move items between the first plurality of bins. The first item handling system utilizes a vacuum force to remove items held in the first plurality of bins. The system further includes a second robotic sorting system. The second robotic sorting system includes a second item handling system configured to travel between a second plurality of bins and move items between the second plurality of bins. The second item handling system utilizes a vacuum force to remove items held in the second plurality of bins. The system further includes a chute connecting the first plurality of bins and the second plurality of bins. Additionally, the system includes a control system coupled to the first robotic sorting system and the second robotic sorting system. The control system controls movement of the first robotic sorting system and the second robotic sorting system.

BRIEF DESCRIPTION OF THE DRAWINGS

The present disclosure will become better understood from the detailed description and the drawings, wherein.

DETAILED DESCRIPTION

Figure 1A:
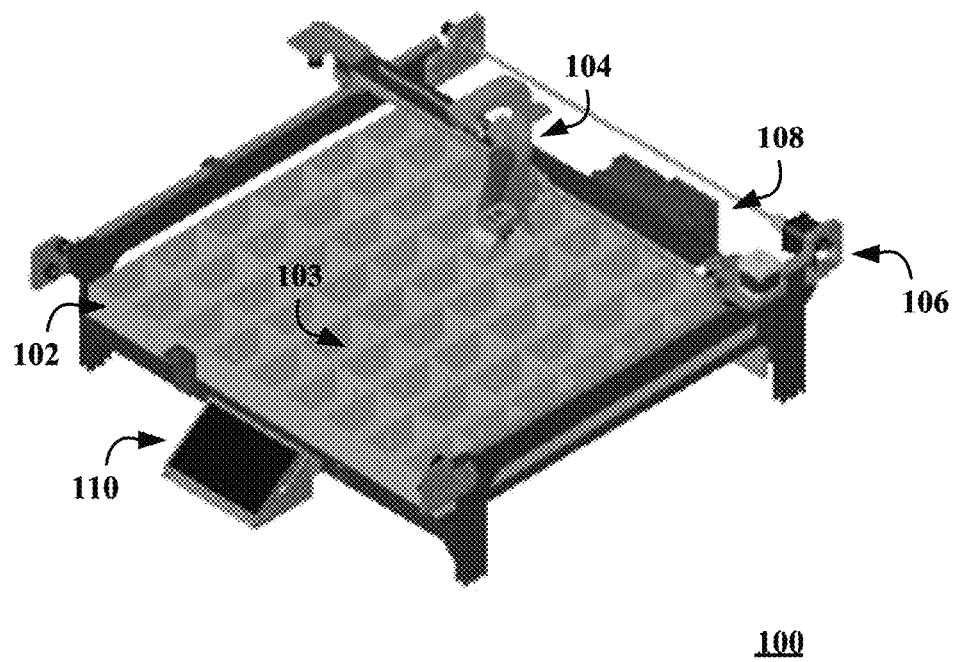
FIGS. 1A-1D illustrates different perspective views of an example of an item sorting system, according to various implementations.

For simplicity and illustrative purposes, the principles of the present teachings are described by referring mainly to examples of various implementations thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific examples of various implementations. Logical and structural changes can be made to the examples of the various implementations without departing from the spirit and scope of the present teachings. The following detailed description is, therefore, not to be taken in a limiting sense and the scope of the present teachings is defined by the appended claims and their equivalents.

In addition, it should be understood that steps of the examples of the methods set forth in the present disclosure can be performed in different orders than the order presented in the present disclosure. Furthermore, some steps of the examples of the methods can be performed in parallel rather than being performed sequentially. Also, the steps of the examples of the methods can be performed in a network environment in which some steps are performed by different computers in the networked environment.

Some embodiments are implemented by a computer system. A computer system can include a processor, a memory, and a non-transitory computer-readable medium. The memory and non-transitory medium can store instructions for performing methods and steps described herein.

According to implementations, a sorting system includes a linear or rotational motion machine which operates over an array or grid of bins. Each bin is sized to hold items (e.g., cards) with a small margin to accommodate placement of the card in the card sorting system. The bins are used to keep items separate throughout sorting so the sorting system can ensure the location of each identified item is known, and keep unidentified items separated from identified items. In some implementations, the bins can be clear to minimize shadows cast on unidentified items to increase the accuracy of identification. In some implementations, the bins can be opaque. The bins include holes, slots, or other openings in the bottom to decrease the adherence force on the items located in the bins. Additionally, each bin has holes, slots, or other openings in the side walls to allow air to pass between the bins freely, which facilitates quick retrieval and separation of any item from a stack or the end effector. The top edges of the bins are also chamfered or rounded to prevent items (e.g., cards) from resting at the top of the bins. An input row of bins, which is nearest the front of the sorting system, can also be modified to facilitate other sort or search implementations. The first row of bins, closest to where a user may interact with the machine, can be removable, to allow for quick unload of a previous sort and loading of a new sort, so the machine downtime is minimized. The bins may also be generally removable as to allow operator or user access to various bins within the array.

The sorting system uses a vacuum end effector which can pick up a card using a vacuum acting on an area of the card, resulting in a holding force. The sorting system utilizes one or more curvature generation devices in combination with the vacuum end effector A curvature generation devices impart a curvature to the item (e.g., card) being lifted so the other cards fall away and do not remain attached or adhered to the card being lifted. The curvature generation devices ensure that only one item (e.g., card) is retrieved during a move. For example, due to the flatness and smoothness of the cards, when the top card in a stack is secured by the vacuum end effector, cards below the top card may adhere to that card, which is undesirable because cards below the top card have not been identified. To counter this, the curvature generation devices prevent the vacuum end effector from lifting more than the secured card in a quick movement of the vacuum end effector, where the number of cards below the top card is not predictable. The sorting system can also include more than one vacuum end effector, operating on one or more gantries that work in tandem to facilitate sorting or reorganizing of items.

In implementations, the sorting system can be enclosed in a cabinet or other enclosure type as with a kiosk that will allow a user to insert their items (e.g., cards) to be sorted in a manner that distances the user from the motion system. As a kiosk system, the sorting system can automate the loading and unloading of the items in a way that makes the machine more accessible to the untrained user. The sorting system can also be used as an automated inventory management system, where the items are not loaded into the machine to be sorted but are instead stored in the machine to be output to fulfill an order. When operated as an inventory management system, the sorting system can employ a larger form factor and/or employ multiple copies to aid in the sorting and storing of the items. For example, to adequately store sufficient items to manage an entire inventory, the form factor may be much larger in length and width. Likewise, for example, a single sorting system can also be stacked on top of other sorting systems, to diminish the floor space taken by the inventory management system or sorting system.

In implementations, the sorting system includes control system, e.g., a computer, central processor, a microcontroller or the like, which pairs the software recognition algorithms with the hardware to command the motion system and vacuum end effector behavior. The control system can also be utilized to manage and control the storage and tracking of cards when the card sorting system is utilized as an inventory management system.

FIGS. 1A-1E are diagrams illustrating an example of a sorting system 100 that can be used in various implementations. While FIGS. 1A-1E illustrate various components contained in the sorting system 100, FIGS. 1A-1E illustrate one example of a sorting system and additional components can be added and existing components can be removed.

As illustrated in FIG. 1A, the sorting system 100 includes a bin system 102, an item handing system 104, a drive system 106, a control system 108, and an interface 110. The bin system 102 is configured to hold and store items to be sorted, inventoried, and managed. In some implementations, the bin system 102 can be configured to hold and store cards to be sorted, inventoried, and managed. The bin system 102 includes a number of bins 103 that allow for input card stacks to be placed into the sorting system 100. In this example, the sorting system 100 can take cards out of the input and use a recognition algorithm to identify each card. Example cards which can be sorted on the sorting system 100 include Magic: The Gathering, Pokemon, Yugioh, Baseball, Playing Cards, or other card based game or printed surface. While described herein as sorting cards, the storing system 100 can be utilized to sort other items such as toys, blocks, nail, screws, or other objects with consistent and distinguishable characteristics needed to be sorted.

The item handling system 104 and the drive system 106 operate in combination to move items one at a time by the linear motion. The drive system 106 can employ separate axes for each planar dimension of the bins 103, neglecting the vertical dimension, which work in unison to coordinate the placement of the item handling system 104 over a bin 103. For example, the item handling system 104 and the drive system 106 can move cards one at a time for removal from one bin 103 and placement in another bin 103. The item handling system 104 works above the bin system 102, reaching down into any particular bin 103 to retrieve an item utilizing a vacuum, or releasing an item into a bin 103.

Figure 1B:
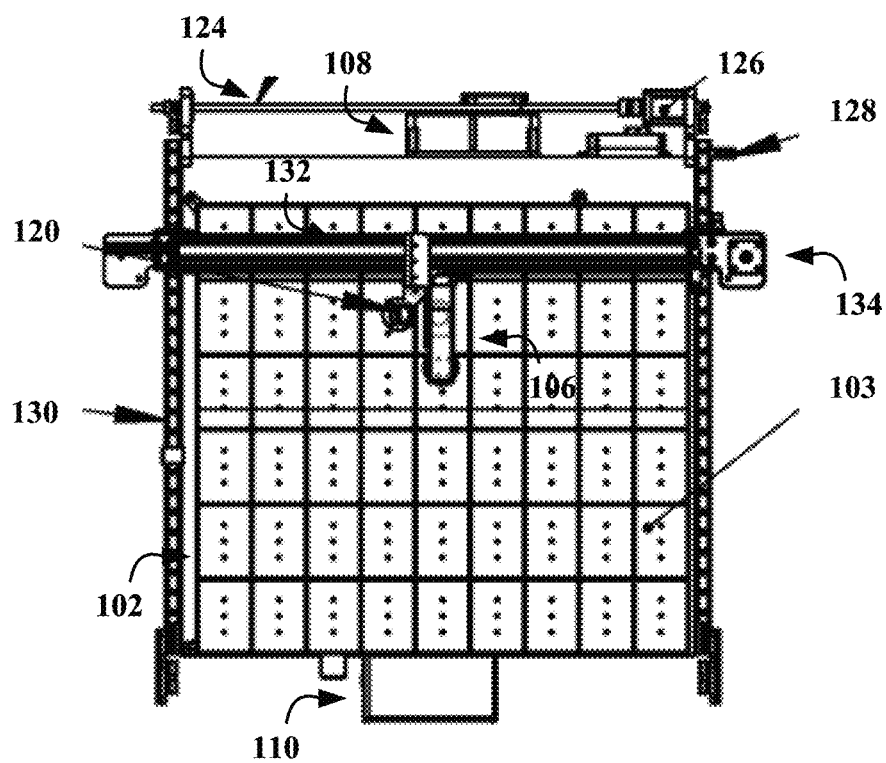
Figure 1C:
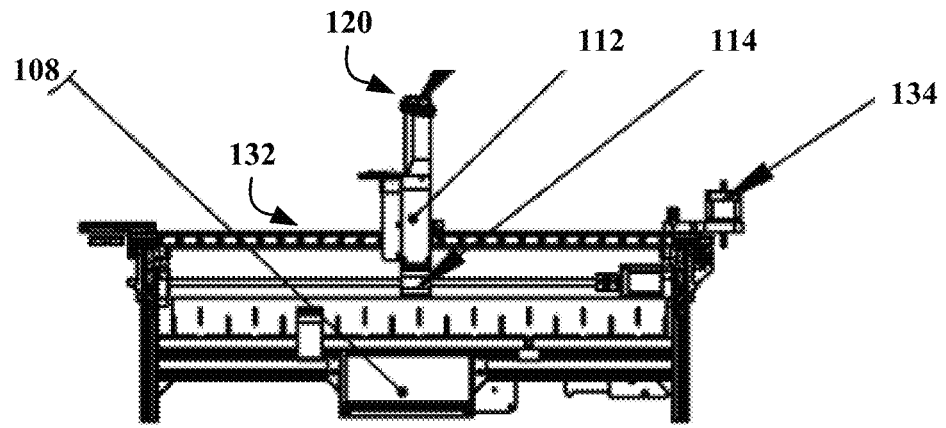
Figure 1D:
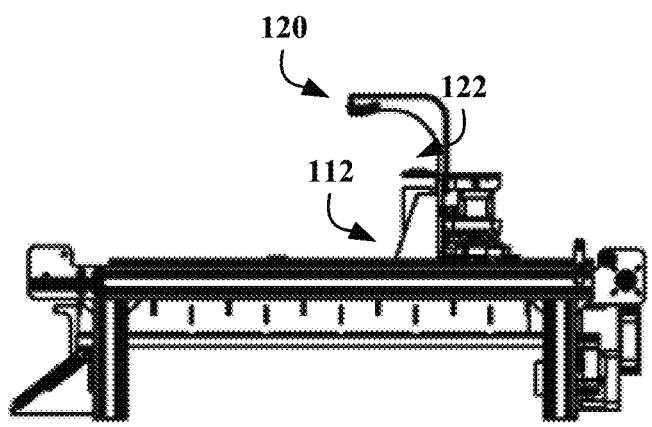

As illustrated in FIG. 1B, the item handling system 104 includes vacuum end effector 112 and an end effector tip 114. The item handling system 104 utilizes the vacuum end effector 112 to pick up, move and release an item. The vacuum end effector 112 is configured to pick up an item (e.g., card) using vacuum or negative pressure acting on an area of the item, resulting in a holding force. The vacuum can be generated by a pump or syringe which evacuates the air from an enclosed volume within the vacuum end effector 112. The evacuation causes the vacuum end effector 112 to actuate and extend towards the item in a bin 103. The vacuum end effector 112 extends downward from a resting position to the top most item in a stack (e.g., cards), creates a seal between the end effector tip 112 and item by which the holding force is created, and retracts back to the resting position with the held item.

The end effector tip 114 is constructed of a material that reduces potential damage to the item. For example, the end effector tip 114 can include a soft rubber, foam, plastic polymer, or silicone cup. The end effector tip 114 can flex slightly upon contact with the item (e.g., card) to create a seal and also reduce the impact to the card by the end effector tip 114 so the item is not damaged. A solenoid or other switch can be used to control the vacuum end effector 112 behavior.

The vacuum and kinetic motion of the vacuum end effector 112 together decouple the forces which hold and move the item (e.g., card), and thus allow relatively larger forces to act in moving the item. This combination increases the speed of the sort, while keeping the forces which directly interact with the item minimal and distributed. This combination operates similar to the concept of an ornithopter with decoupled lift and thrust force systems, the wing and engine, respectively, employed on modern aircraft.

Figure 1E:
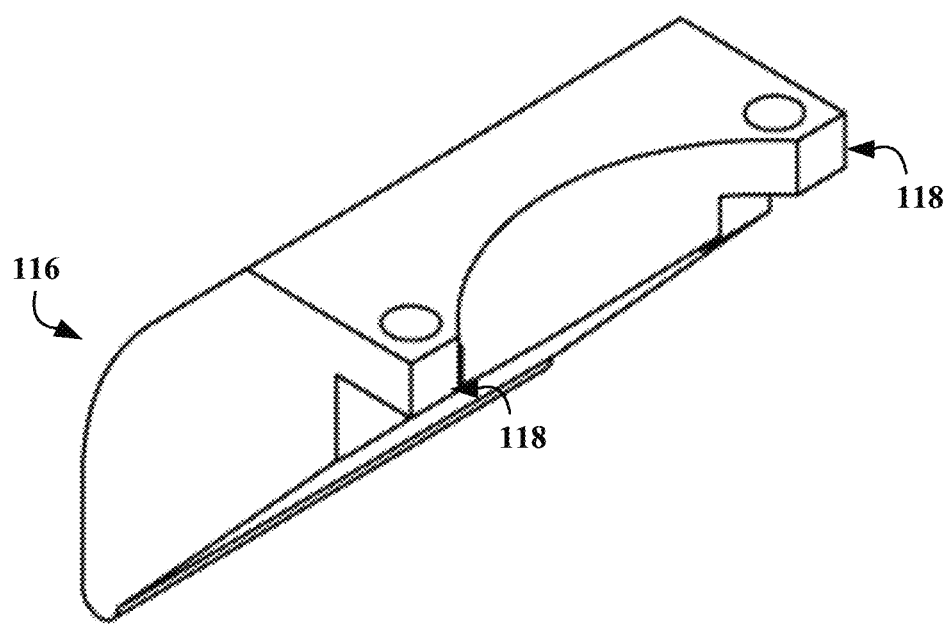
FIG. 1E illustrates a diagram of an example of curvature generation device for use in an item sorting system, according to various implementations.

The vacuum end effector 112 also include one or more curvature generation devices 116, as illustrated in FIG. 1E. The curvature generation devices 116 ensure that only one item (e.g., card) is retrieved during a move. For example, due to the flatness and smoothness of the cards, when the top card in a stack is secured by the vacuum end effector 112, cards below the top card may adhere to that card. As such, it is possible to lift more than the secured card in a quick movement of the vacuum end effector 112, where the number of cards below the top card is not predictable. This behavior is undesirable because cards below the top card have not been identified, and thus if they continue to adhere themselves to the top card, can end up in unanticipated positions and break the sort order.

In unison with the vacuum end effector 112, a curvature generation devices 116 imparts a curvature to the top item (e.g., card) when the vacuum end effector 112 is fully retracted and the item is held. While the top item is being held in place by the end effector tip 114, any cards adhered to the top item lack deliberate forces holding them in place. The curvature of the top item induced by the curvature generation device 116 creates separation between the top item and the next item adhered to the top item. The adhering force between the two decreases by way of decreased contact area, and gravity overcomes the adherence force and the next item falls away from the top item. Thus, single item identification (e.g., card) and transportation between the bins is facilitated with the curvature generation device. In some implementations, the curvature generation device 116 can be passive, which does not require additional sensors, electronics, nor mechanisms to function.

As illustrated in FIG. 1E, the curvature generation device 116 can include two posts 118 which extend either side of the end effector tip 114. The curvature generation device 116 interacts only with two sides of the item (e.g., card). In some implementations, the curvature generation device 116 can include additional posts and may interact with all sides of the item to increase the overall curvature of the top item, and thus the rate of rejection of adhered items. In some implementations, the curvature generation device 116 can also be position in the middle of two end effector tip 114.

Figure 1F:
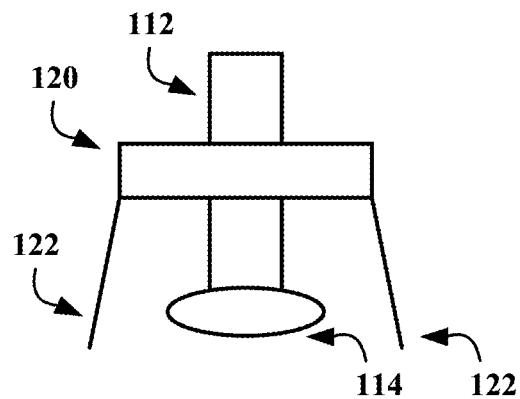
FIG. 1F-1I illustrate diagrams of another example of curvature generation device for use in an item sorting system, according to various implementations.

FIG. 1F illustrates a front view of another example of curvature generation device 120, according to implementations. As illustrated in FIG. 1F, the curvature generation device 120 includes two post 122. The curvature generation device 120 is positioned on the vacuum end effector 112 so that the posts 122 extend below the end effector tip 122. The two posts 122 of the curvature generation device 120 interact only with two sides of the item (e.g., card) thereby imparting a curvature on the item when retracted out of the bin 103.

Figure 1G:
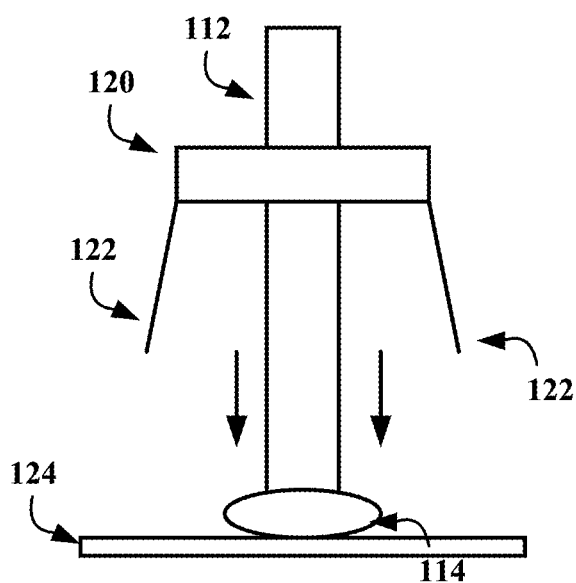
Figure 1H:
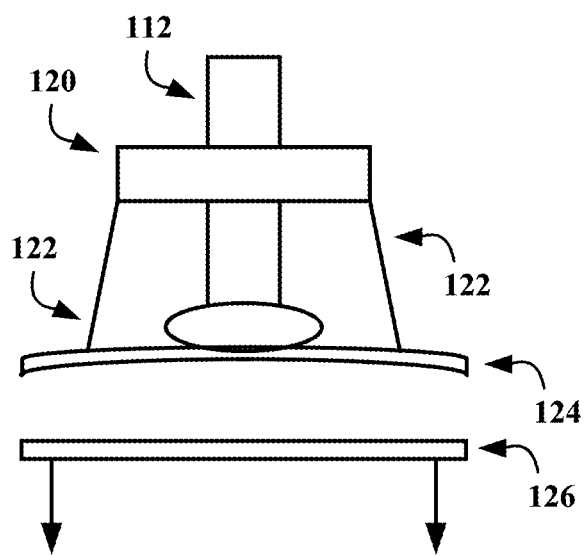

For example, as illustrated in FIG. 1G, in operation, the vacuum end effector 120 extends into a bin 103 and the end effector tip 114 contacts a card 124. The vacuum end effector 120 generates a vacuum seal between the end effector tip 114 and the card 124, and the vacuum end effector 112 retracts. As illustrated in FIG. 1H, once retracted, the curvature generation device 120, i.e., the post 122, imparts a curvature on the card 124. As such, any additional cards 126, which may be struck to the card 124, for example, by static force, are separated from the card 124 and fall back into the bin 103.

Figure 1I:
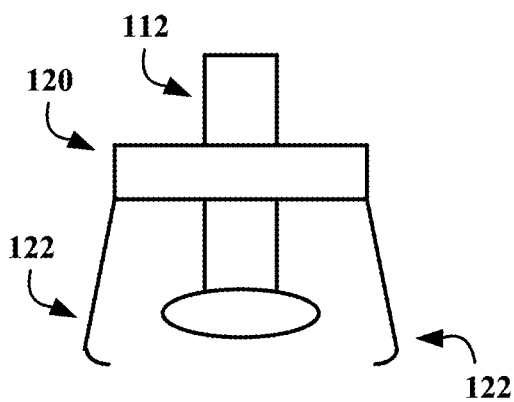

In implementations, the curvature generation device 120 can be constructed of any material, such as metal, plastic, etc. Likewise, the posts 122 can be constructed in any shape or configuration to impart a curvature on the items without damaging the items. For example, as illustrated in FIG. 1F the posts 122 can be configured as a square or rectangular plate with a flat edge. Likewise, for example, as illustrated in FIG. 1I, the posts 122 can be configured as a square or rectangular plate with a curved edge. One skilled in the art will realize that the curvature generation device 120 and the posts 122 can be configured in any shape in order to generate a curvature on the items being moved by the vacuum end effector 112.

The item handling device 104 includes an illumination source 120 and a recognition device 122. The illumination source 120 can be configured to illuminated objects within the bins 103 for recognition by the recognition device 122. The illumination source 120 can be any type of device that produces electromagnetic radiation, for example, a light, a lamp, a laser, etc. The recognition device 122 can be any type of electronic device that detects reflected electromagnetic radiation reflected from the items and determines features of the items in the bins 103. For example, the recognition device 122 can include a digital camera. The combination of the illumination source 120 and the recognition device 122 allows the items in the bins 103 to be identified without contacting the items for identification.

The drive system 106 is configured to move the item handling device 104 with two-dimensional linear motion to position the item handling device 104 over the bins 103. The drive system 106 includes a coupling rod 124, a stepper motor 126, an end stop 128, linear rails 130, recognition, gantries 132, and a stepper motor 134. The gantries 132 are driven by the stepper motors 126 and 134 which push and pull the gantries 132. The gantries 132 can be driven with a belt drive, direct driver, rack and pinion, or lead screws. To reduce friction during travel, ball bearings or ball bearing carriages may be used with the linear rails 130.

The control system 108 can be configured to control the movement and operation of the item handling system 104 and the drive system 106. The control system 108 can include control electronics and software to operate the item handling system 104 and the drive system 106. For example, the control system 108 can include a control board, such as Smoothieboard, Arduino, or Duet, will be used to control the stepper motors 126 and 134. Likewise, the control system 108 can be configured to operate one or more algorithms to identify the items in the bin system 102 and sort and place items in different bins 103. The control system 108 can include components of an electronic control system such as processors, microcontrollers, memory, buses, and the like to operate the item sorting system 100. Likewise, the control system 108 can include one or more communication ports that allow external electronic devices to communicate with the control system. The communication ports can include wired communication ports and wireless communication ports.

The control system 108 can store and utilize one or more sorting algorithms. The sorting algorithms can include a simple patience algorithm, a greedy algorithm, or may be a more complex optimization algorithm such as genetic algorithm, branch and bound, or other algorithm such as those identified in "Introduction to Algorithms" by T. Cormen. The sorting algorithm can be selected to minimize the time to sort.

The interface 110 is a user interface that allows a user to interact with the sorting system 100. The interface 110 can include any type of interface that allows the user communicate with the sorting system 100, e.g., keyboard, keypad, scroll wheel, dial, button, number pad, directional pad, visual display, touch screen display, etc. Likewise, the interface 110 can include a communication interface that allows communication with an electronic device of the user, e.g., cell phone, computer, laptop, tablet, etc. or software running on the electronic device. In some implementations, the user can utilize the interface 110 to operate the sorting system 100, select the sorting algorithm, specify which item to sort, specify the bins 103 in which items will be placed, etc.

In operation, the sorting system 100 can be configured to operate on a stack of input items (e.g., cards) and sort the cards according to parameters specified to the sorting algorithm. For example, a user can specify an order for any input stack of cards or sort out a particular set of cards. Once all cards in the input have been identified and distributed into the buffer bins 103, the sorting system 100 can recombine the cards from the buffer bins 103 into the output stacks according to the sorting algorithm.

Figure 2A:
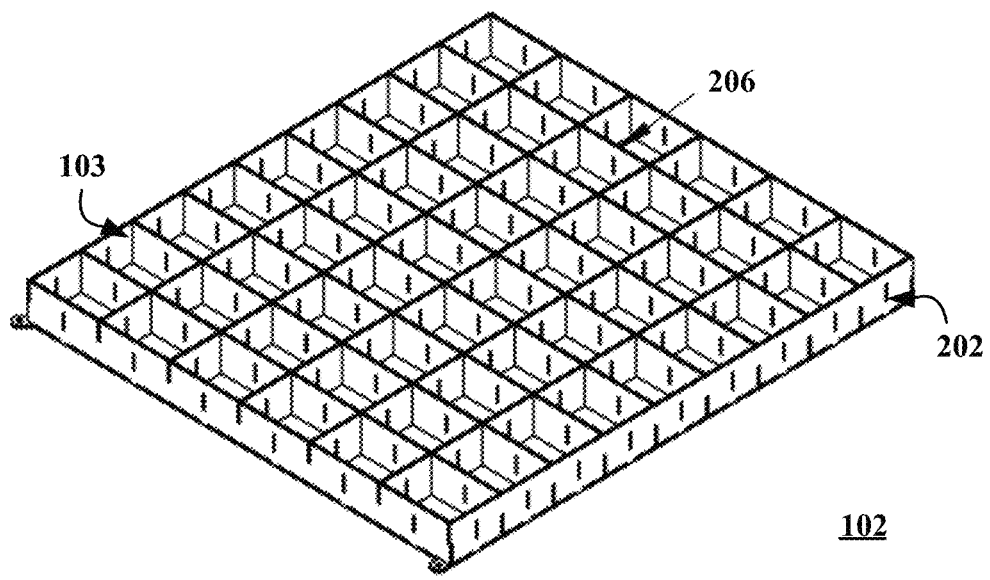
FIGS. 2A-2C illustrates different perspective views of an example of a bin system for use in an item sorting system, according to various implementations.
Figure 2B:
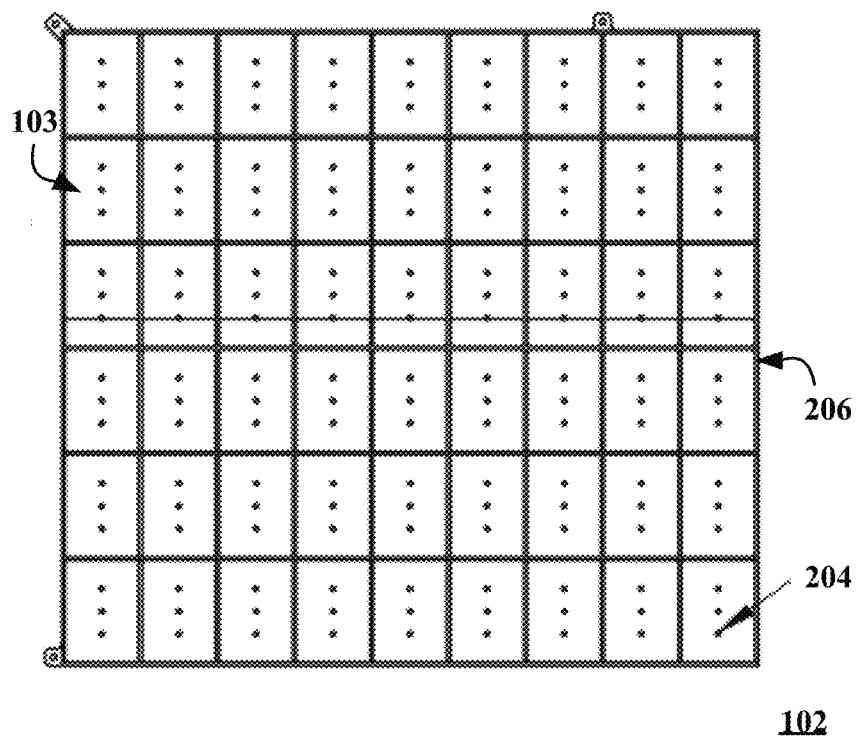
Figure 2C:
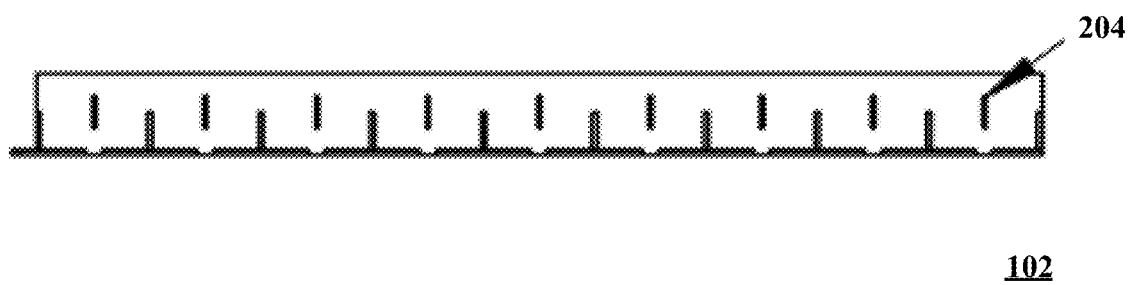

FIGS. 2A-2C illustrated different views of the bin system 102. The bins 103 are organized in a fixed grid, with the dimensions of the grid dependent on the desired rate of sorting. More bins can be added to increase the footprint of the sorting system 100.

In implementations, the bins 103 can be transparent or translucent to allow for light to pass through the walls of the bins 103. This allows for improved recognition of the items. Clear bins can provide improved recognition of items because the recognition algorithms prefer a plain, detail or design free background for detection. Otherwise, the background may be confused with the object being identified. To accommodate this, the recognition algorithm can be configured to not require a specific colored background. As such, the sorting system 100 does not require a plain, detail or design free background for detection and prevents opaque bins from creating lighting issues which detract from the recognition algorithm performance. In some implementations, the bins can be opaque. In some implementations, the bins 103 can be constructed of glued acrylic or vacuum formed in one or multiple pieces. In some implementations, the bins 103 can be machined out of metal or plastic polymer.

In most confined spaces, an issue exists for the bottom most items (e.g., cards) which are arranged in a stack that rests on the bin surface. As with adherence between cards, the bottom item may adhere to the bin base as both surfaces are smooth and flat. This can pose an issue for the vacuum end effector 112 as the adherence force between the bottom item and the bin base may be greater than the retraction force exerted on the item by the vacuum end effector 112. The bin base does not move freely as with bottom items which may move beneath the top card freely. Thus, the vacuum end effector 112 may stick in the actuated position and fail to retract at all. To address this issue, depressions 204 are created in the base of each bin 103 by etching or removing material from the bin base. The depression 204 can include holes, slots, offset spacers, abrasion of the bin base, or any type of depression, which creates a space for air to flow between the bottom item and the bin base to decrease the adherence force.

In addition to the created separation distance of the bottom of the bins and items, air passage 202 are formed in sides of the walls of the bins 103 to ensure air flows more freely from the relatively confined space. The air passages 202 can include holes, slots, squares, etc. To limit the overall footprint of the sorting system 100, the bins 103 can be designed to have near the same length and width dimensions of the items (e.g., cards) being sorted. This results in very little gap between the card edge and the wall of the bin 103 for air to flow. Air trapped behind a falling card decreases the fall rate of the item, and thus increases the time for a released card to separate from the vacuum end effector 112. Increased air flow behind an item retrieved by the vacuum end effector 112, allowed by the included air passages 202, can increase the likelihood of separation between the retrieved item and any bottom items which may adhere to the retrieved item. The top most edges of the bins 103 include chamfered or rounded surfaces 206. This can ensure that any items released from the vacuum end effector 112 fall into the bin 103 rather than sitting on the top edge In implementations, the sorting system 100 can store items (e.g., cards) and be utilized as an inventory management system. In these implementations, the sorting system can be designed larger than the table-top form factor to accommodate larger numbers of items. For example, to adequately store sufficient items to manage an entire inventory, the form factor of the sorting system 100 can be designed larger in length and width. In some implementations, a single copy of the sorting system 100 can be stacked on top of other copies of the sorting system 100. This reduces the floor space taken by the inventory management system or sorting system. In this implementation, the bin walls can be positioned perpendicular to the base of the sorting system 100. In this case, the outer input wall may be removed entirely and replaced with a slide system, which better facilitates processing through stacks of items much greater than what would be allowed by the nominal bin height. Instead of taking the undesired items and putting them in the bins 103, which will eventually fill, a slide or chute system can push the items into another hopper or storage, or other sorting system 100. As such, a user can keep loading in stacks of items to search a particular card or organize a large collection of items, without needing to eventually unload the bins 103 after they are full.

When a single sorting system 100 is coordinated with other sorting system 100, the multiple stacked or connected sorting systems 100 can work in unison to collate the output stack from outputs of each sorting system 100. This may be necessary when items that need to go into the output stack are not all stored in the same sorting system 100. Multiple sorting system 100 can be networked to a central processing platform, which determines what cards each sorting system 100 needs to output, and in what order, to aggregate the entire output stack. They can be networked over wireless or ethernet, or similarly via USB or Bluetooth, or other wireless or wired technology. Each individual sorting system 100 may have a local output which can then be recombined by a centralized and final sort process that ensures the output stack is in the desired order.

The inventory management system can also work on multiple orders simultaneously, to minimize the overall output stack completion time. This is another factor that will go into what sort algorithm will be used to complete the output stacks which the user may change at any time. For example, if a particular order is high priority, all other processes may be stopped to fulfill that one order.

In various embodiments, the components of control system 108 can be implemented as software programs or modules that perform the methods, process, and protocols described herein. The software programs or modules can be written in a variety of programming languages, such as JAVA, C++, Python code, Visual Basic, hypertext markup language (HTML), extensible markup language (XML), and the like to accommodate a variety of operating systems, computing system architectures, etc.

Figure 3A:
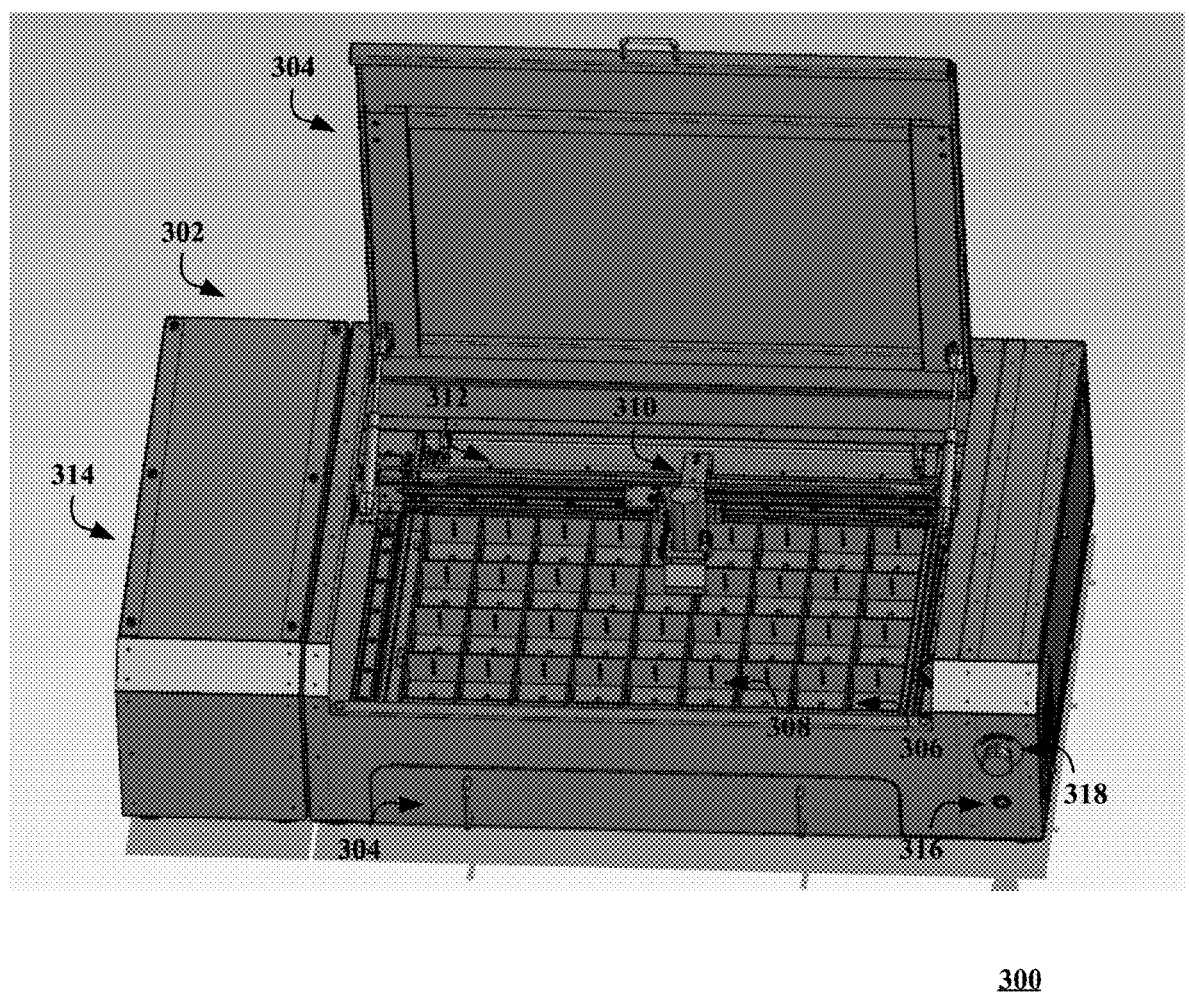
FIGS. 3A-3C illustrates different perspective views of an example of a card sorting system, according to various implementations.
Figure 3B:
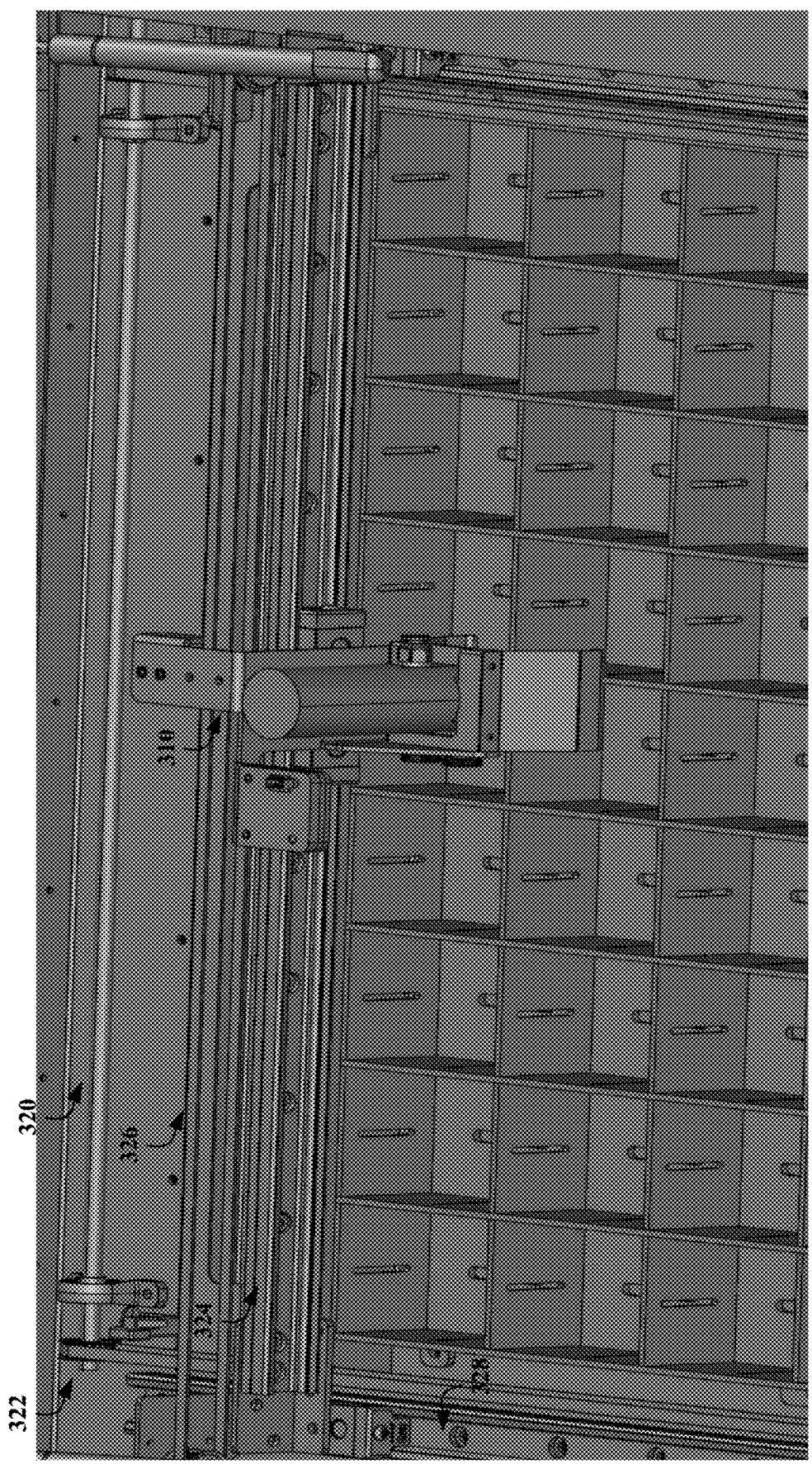
Figure 3C:
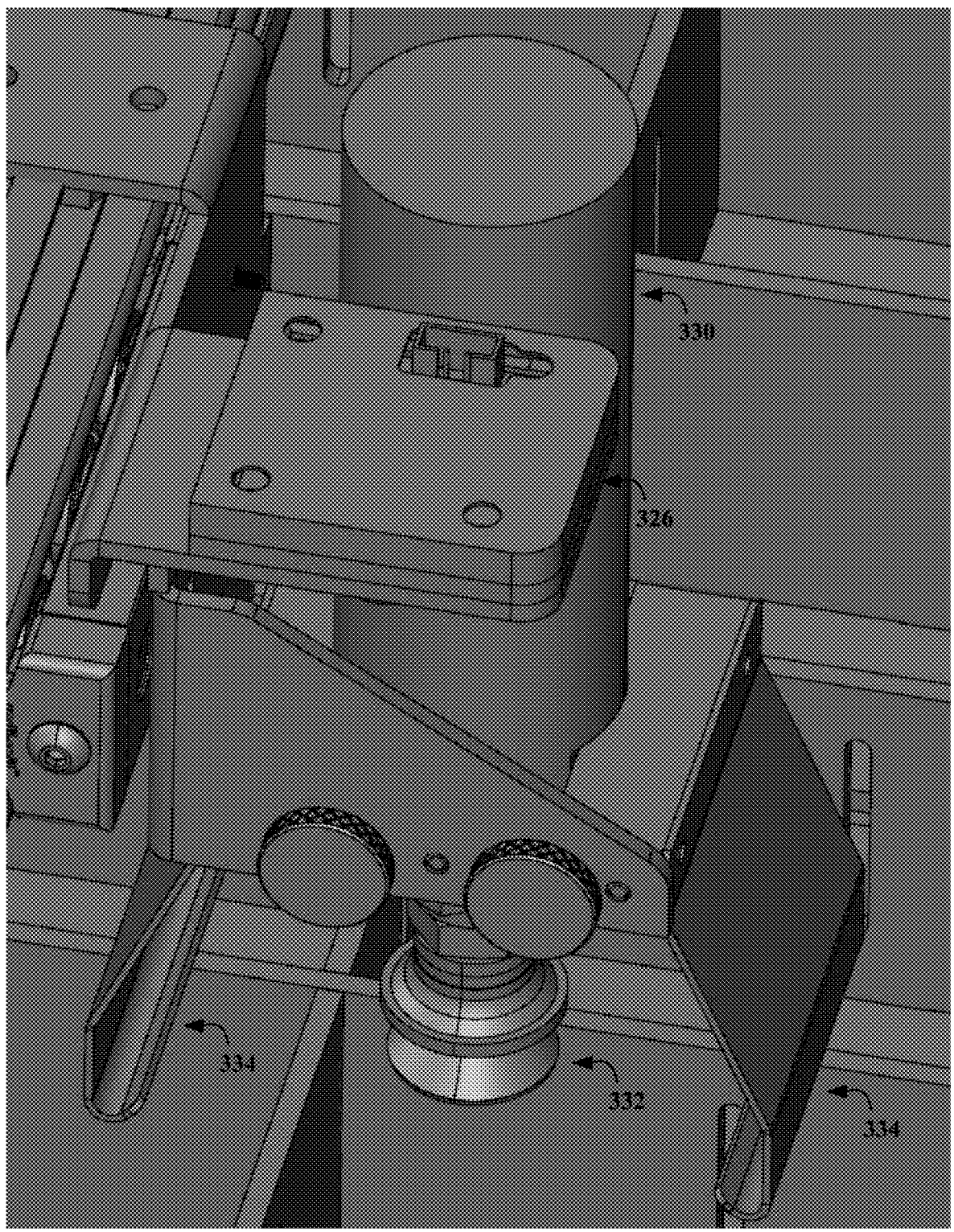

FIGS. 3A-3C are diagrams illustrating an example of a sorting system 300 with a desk top form factor that can be used in various implementations. While FIGS. 3A-3C illustrate various components contained in the sorting system 300, FIGS. 3A-3C illustrate one example of a sorting system and additional components can be added and existing components can be removed.

As illustrated in FIG. 3A, the sorting system 300 includes a housing 302, doors 304, a bin system 306 with bins 308, an item handing system 310, a drive system 312, a control system 314 (as described above), an interface 318 (as described above), and a communication port 316. The bin system 306 is configured to hold and store items to be sorted, inventoried, and managed. In some implementations, the bin system 306 can be configured to hold and store cards to be sorted, inventoried, and managed. The bin system 306 includes a number of bins 308 that allow for input card stacks to be placed into the sorting system 300. In this example, the sorting system 300 can take cards out of the input and use a recognition algorithm to identify each card. Example cards which can be sorted on the sorting system 300 include Magic: The Gathering, Pokemon, Yugioh, Baseball, Playing Cards, or other card based game or printed surface. While described herein as sorting cards, the storing system 300 can be utilized to sort other items such as toys, blocks, nail, screws, or other objects with consistent and distinguishable characteristics needed to be sorted.

The item handling system 310 and the drive system 312 operate in combination to move items one at a time by the linear motion. The drive system 312 can employ separate axes for each planar dimension of the bins 308, neglecting the vertical dimension, which work in unison to coordinate the placement of the item handling system 310 over a bin 308. For example, the item handling system 310 and the drive system 312 can move cards one at a time for removal from one bin 308 and placement in another bin 308. The item handling system 310 works above the bin system 306, reaching down into any particular bin 308 to retrieve an item utilizing a vacuum, or releasing an item into a bin 308.

As illustrated in FIG. 3B, the drive system 312 is configured to move the item handling device 310 with two-dimensional linear motion to position the item handling system 310 over the bins 308. The drive system 312 includes a coupling rod 320, a stepper motors (not shown), drive belts 322 and 324, gantries 326, and linear rails 328. The gantries 326 are driven by the stepper motors connected to the drive belts 322 and 324 which push and pull the gantries 326. To reduce friction during travel, ball bearings or ball bearing carriages may be used with the linear rails 328.

As illustrated in FIGS. 3B and 3C, the item handling system 310 includes vacuum end effector 330 and an end effector tip 332. The item handling system 310 utilizes the vacuum end effector 330 to pick up, move and release an item. The vacuum end effector 330 is configured to pick up an item (e.g., card) using vacuum or negative pressure acting on an area of the item, resulting in a holding force. The vacuum can be generated by a pump or syringe which evacuates the air from an enclosed volume within the vacuum end effector 330. The evacuation causes the vacuum end effector 330 to actuate and extend towards the item in a bin 308. The vacuum end effector 330 extends downward from a resting position to the top most item in a stack (e.g., cards), creates a seal between the end effector tip 332 and item by which the holding force is created, and retracts back to the resting position with the held item.

The end effector tip 332 is constructed of a material that reduces potential damage to the item. For example, the end effector tip 332 can include a soft rubber, foam, plastic polymer, or silicone cup. The end effector tip 332 can flex slightly upon contact with the item (e.g., card) to create a seal and also reduce the impact to the card by the end effector tip 332 so the item is not damaged. A solenoid or other switch can be used to control the vacuum end effector 330 behavior.

The vacuum and kinetic motion of the vacuum end effector 330 together decouple the forces which hold and move the item (e.g., card), and thus allow relatively larger forces to act in moving the item. This combinations increases the speed of the sort, while keeping the forces which directly interact with the item minimal and distributed. This combination operates similar to the concept of a transition in an ornithopter from the decoupled lift and thrust force systems, the wing and engine, respectively, employed on modern aircraft.

The vacuum end effector 330 also include one or more curvature generation devices 334, as illustrated in FIG. 3C. The curvature generation devices 334 ensure that only one item (e.g., card) is retrieved during a move. For example, due to the flatness and smoothness of the cards, when the top card in a stack is secured by the vacuum end effector 330, cards below the top card may adhere to that card. As such, it is possible to lift more than the secured card in a quick movement of the vacuum end effector 330, where the number of cards below the top card is not predictable. This behavior is undesirable because cards below the top card have not been identified, and thus if they continue to adhere themselves to the top card, can end up in unanticipated positions and break the sort order.

In unison with the vacuum end effector 330, a curvature generation devices 334 imparts a curvature to the top item (e.g., card) when the vacuum end effector 330 is fully retracted and the item is held. While the top item is being held in place by the end effector tip 332, any cards adhered to the top item lack deliberate forces holding them in place. The curvature of the top item induced by the curvature generation device 334 creates separation between the top item and the next item adhered to the top item. The adhering force between the two decreases by way of decreased contact area, and gravity overcomes the adherence force and the next item falls away from the top item. Thus, single item identification (e.g., card) and transportation between the bins is facilitated with the curvature generation device. In some implementations, the curvature generation device 334 can be passive, which does not require additional sensors, electronics, nor mechanisms to function.

The item handling device 310 includes an illumination and recognition device 326. The illumination and recognition device 326 can be configured to illuminated objects within the bins 308 for recognition by the illumination and recognition device 326. The illumination and recognition device 326 can be any type of electronic device that detects reflected electromagnetic radiation reflected from the items and determines features of the items in the bins 308. For example, the illumination and recognition device 326 can include a digital camera. The combination of the illumination and recognition device 326 allows the items in the bins 308 to be identified without contacting the items for identification.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "calculating" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

The present disclosure also relates to an apparatus for performing the operations herein. This apparatus can be specially constructed for the intended purposes, or it may comprise a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), erasable programmable read-only memories (EPROMs), electrically erasable programmable read-only memories (EEPROMs), magnetic or optical cards, flash memory devices, or any type of media suitable for storing electronic instructions, each coupled to a computer system bus. Examples of implementations of the present disclosure can also be provided as a computer program product, or software, that may include a machine-readable medium having stored thereon instructions, which can be used to program a computer system (or other electronic devices) to perform a process according to the present disclosure.

Various general purpose systems can be used with programs in accordance with the teachings herein, or a more specialized apparatus can be utilized to perform the method. Examples of the structure for a variety of systems appear in the description above. In addition, the present disclosure is not described with reference to any particular programming language. It will be appreciated that a variety of programming languages may be used to implement the teachings of the disclosure as described herein.

A number of implementations have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be provided, or steps may be eliminated, from the described flows, and other components can be added to, or removed from, the described systems. Accordingly, other embodiments are within the scope of the following claims.

What is claimed is:

1. A system for robotic sorting, the system comprising:
   a bin system comprising a plurality of bins for holding items to be sorted, wherein each bin is configured to hold more than one of the items;
   an item handling system configured to travel to each of the plurality of bins, wherein the item handling system comprises:
      an end effector that utilizes a vacuum force to remove an item held in one of the plurality of bins, and
      one or more curvature generation devices, comprising an item contact portion, wherein the item contact portion engages an upper surface of the item and imparts a curvature on the item, as the item is raised by the end effector from the one of the plurality of bins, wherein the end effector is configured to extend and retract relative to the one or more curvature generation devices, and enable movement of a single item;

a drive system coupled to the item handling system, wherein the drive system is configured to move and position the item handling system over each of the plurality of bins; and a control system coupled to the drive system and the item handling system, wherein the control system controls movement of the item handling system and the drive system.

2. The system of claim 1, wherein each of the plurality of bins comprises one or more air passages positioned in wall surfaces of each of the plurality of bins.

3. The system of claim 1, wherein each of the plurality of bins comprises one or more depressions in a bottom surface of each of the plurality of bins.

4. The system of claim 1, wherein each of the plurality of bins comprises a chamfered edge surface positioned at a top surface of the each of the plurality of bins.

5. The system of claim 1, wherein each of the plurality of bins is formed with cross sectional dimensions associated with a type of card.

6. The system of claim 1, the system further comprising: an interface coupled to the control system and configured to control operation of the system.

7. The system of claim 1, wherein the control system comprises:
one or more memory devices storing instructions for tracking the items held in the plurality of bins and for operating the item handling device and drive system according to an inventory management system; and
one or more processors coupled to the one or more memory devices and configured to execute the instructions to move the items between the plurality of bins according to the inventory management system.

8. The system of claim 1, wherein at least one vacuum tip and the end effector are configured to move vertically, with an upward and downward movement, relative to the one or more curvature generation devices, allowing the at least one vacuum tip to move below or above the item contact portion.

9. The system of claim 1, wherein the control system comprises:
one or more memory devices storing instructions for operating the item handling device and drive system according to a sorting algorithm; and
one or more processors coupled to the one or more memory devices and configured to execute the instructions to move the items between the plurality of bins according to the sorting algorithm.

10. The system of claim 9, wherein the sorting algorithm is configured to identify and sort a particular item specified by a user.

11. The system of claim 1, wherein the item handling system comprises:

an end effector tip positioned at a distal end of the end effector and configured to extend into the one of the plurality of bins, contact the item, and form a seal with the item; and a vacuum device coupled to the end effector tip and configured to apply the vacuum force to the item, and extract the item from the one of the plurality of bins.

12. The system of claim 11, wherein the end effector tip comprises a flexible material that contacts the item.

13. The system of claim 11, wherein the one or more curvature generation devices are positioned adjacent to the end effector tip, extend below the end effector tip, and are configured to reduce a static force between the item and other item in the one of the plurality of bins.

14. The system of claim 11, wherein the item handling system further comprises:
an illumination source to illuminate the item held in the one of the plurality of bins with electromagnetic radiation; and
a recognition device configured to detect electromagnetic radiation reflected off the item.

15. A device for moving items in a robotic sorting, the device comprising:
a vacuum end effector configured to extend into a bin in a bin system, apply the vacuum force to an item from a group of items held in bin, and extract the item from the bin;
an end effector tip coupled to a distal end of the vacuum end effector and configured to contact the item; and
one or more curvature generation devices, comprising an item contact portion, wherein the item contact portion engages an upper surface of the item from the group of items and imparts a curvature on the item, as the item is raised by the vacuum end effector from the bin, wherein the vacuum end effector is configured to extend and retract relative to the one or more curvature generation devices, and enable movement of a single item.

16. The device of claim 15, wherein the end effector tip comprises a flexible material that contacts the item.

17. The device of claim 15, wherein the one or more curvature generation devices are positioned adjacent to the end effector tip, extend below the end effector tip, and are configured to reduce a static force between the item and other item in the one of the plurality of bins.

18. The device of claim 15, the device further comprising:
an illumination source to illuminate the item held in the bin with electromagnetic radiation; and
a recognition device configured to detect electromagnetic radiation reflected off the item.

19. The system of claim 15, wherein the vacuum end effector and the end effector tip are configured to move vertically, with an upward and downward movement, relative to the one or more curvature generation devices, allowing the end effector tip to move below or above the item contact portion.

* * * * *